United States Patent [19]
Kawachi et al.

[11] Patent Number: 5,375,106
[45] Date of Patent: Dec. 20, 1994

[54] REPRODUCING SYSTEM WITH DETACHABLE STORAGE MEDIUM FOR STORING SELECTED CUE POINTS

[75] Inventors: Hideo Kawachi, Tokyo; Koji Ishiwata; Toshiharu Kondo, both of Kanagawa, all of Japan

[73] Assignee: Sony Corporation, Tokyo, Japan

[21] Appl. No.: 985,281

[22] Filed: Dec. 4, 1992

[30] Foreign Application Priority Data

Dec. 6, 1991 [JP] Japan .................................. 3-349182

[51] Int. Cl.⁵ .............................................. G11B 7/00
[52] U.S. Cl. ........................ 369/32; 369/30; 369/14
[58] Field of Search ............. 369/32, 30, 33, 83, 369/84, 47, 48, 14; 360/13, 15, 8, 10.1, 10.2, 11.1

[56] References Cited

U.S. PATENT DOCUMENTS

| | | | |
|---|---|---|---|
| 4,703,465 | 10/1987 | Parker | 369/30 |
| 4,779,252 | 10/1988 | Custers et al. | 369/30 |
| 4,788,672 | 11/1988 | Toyooka et al. | 369/32 |
| 4,851,931 | 7/1989 | Parker et al. | 360/15 |
| 4,872,151 | 10/1989 | Smith | 369/14 |
| 5,121,483 | 6/1992 | Monahan et al. | 369/30 |
| 5,168,481 | 12/1992 | Culbertson et al. | 369/30 |

OTHER PUBLICATIONS

Patent Abstracts of Japan, vol. 12, No. 319 (P-751) (3166), Aug. 30, 1988, & JP63-83984. JP-63-83984.

*Primary Examiner*—Robert J. Pascal
*Assistant Examiner*—Tan Dinh
*Attorney, Agent, or Firm*—Limbach & Limbach

[57] ABSTRACT

In a reproducing system, a reproducing start position of recording information is set in a first reproducing device reproducible in a second reproducing device. The reproducing start position set in the first reproducing device is stored in a detachable external storage medium. The external storage medium is detached from the first reproducing device, attached to a second reproducing device, and the reproducing start position stored in the external storage medium is read into the second reproducing device. Thus the reproducing start position set by the first reproducing device will be reproduced in the second reproducing device to control a location of selection, such as musical numbers.

9 Claims, 2 Drawing Sheets

REPRODUCING SYSTEM WITH DETACHABLE STORAGE MEDIUM FOR STORING SELECTED CUE POINTS

BACKGROUND OF THE INVENTION

1. Field of the Invention

This invention relates to a reproducing system, and more particularly to an improved reproducing apparatus, for example, a reproducing apparatus suitable for programing in broadcasting stations.

2. Description of the Prior Art

For preparing musical programs in a broadcasting station by means of a reproducing device such as, for example, a compact disc player or the like, the prior art system is such that a programmer finds out a reproducing start position (hereinafter called cue point) whereat a selection, such as a musical number of the number to broadcast (or reproduce) is actually started by having the programmer listen for a reproduced sound of a compact disc according to a programing procedure arranged beforehand. A reproducing standby state is then held at this cue point.

However, if a program is prepared according to such method, then the programmer must locate a reproduced music by hand according to a program procedure when going on the air, thus involving troublesome work for the programmer.

As one conceivable method for solving such problem, a reproducing device can be constructed such that the cue point of a number to be reproduced is specified beforehand (or at the time of rehearsal) by time data indicating time information of the compact disc. This cue point is stored in an internal memory, and thus a reproduced selection, such as a musical number, can be located according to the stored time data.

From using such a reproducing device, troublesome work for locating the selection, such as a musical number, according to the program procedure when going on the air may further be simplified for the programmer.

Then, in the aforementioned reproducing device, data intrinsic to the disc and the cue point of a selection are paired. A multiplicity of these pairs can be stored and thus all the discs to be used for one program and the cue point of the discs are stored, and reproduced in sequence to proceed with the program.

However, a problem inherent in this type of reproducing apparatus is that when loading the compact disc in a reproducing device other than the reproducing apparatus in which the cue point of the compact disc to use is stored, the aforementioned cue point cannot be set. Accordingly, the cue point must be set and reproduced by means of the identical reproducing device, and hence if the cue point is set on the reproducing device in, for example, a rehearsal room, it cannot be reproduced on the reproducing device which is being used for broadcasting.

SUMMARY OF THE INVENTION

In view of the foregoing, an object of this invention is to provide a reproducing apparatus which is capable of detecting and reproducing a set cue point even on a reproducing device other than the reproducing device having set the cue point.

The foregoing objects and other objects of the invention have been achieved by the provision of a reproducing apparatus characterized in that reproducing start position data for reproducing recording information recorded in a recording medium 4 which can be reproduced by a first and a second reproducing devices 2A and 2B is set beforehand in the first reproducing device 2A. The set reproducing start position data is stored in a detachable external storage medium 30. The external storage medium is then detached from the first reproducing device 3A. The reproducing start position data stored in the external storage medium 30 is subsequently incorporated in the second reproducing device 2B loaded with the recording medium 4 or a recording medium with the same content as the recording medium 4. The second reproducing device 2B is controlled according to the incorporated reproducing start position data, thereby detecting a reproducing start position for reproducing the recording information of the recording medium 4 loaded in the reproducing device 2B.

By incorporating start point data set by the first reproducing device 2A in the second reproducing device 2B through the external storage medium 30, the start point data set by the first reproducing device 2A can be reproduced in the second reproducing device 2B.

According to the present invention, an efficient reproducing apparatus can be realized such that a cue point set in a first reproducing device is stored in an external storage medium, and then the cue point stored in the external storage memory is read into a second reproducing device, and thus the cue point set by the first reproducing device will be reproduced in the second reproducing device to control a location of selections, such as musical numbers, to be broadcasted.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
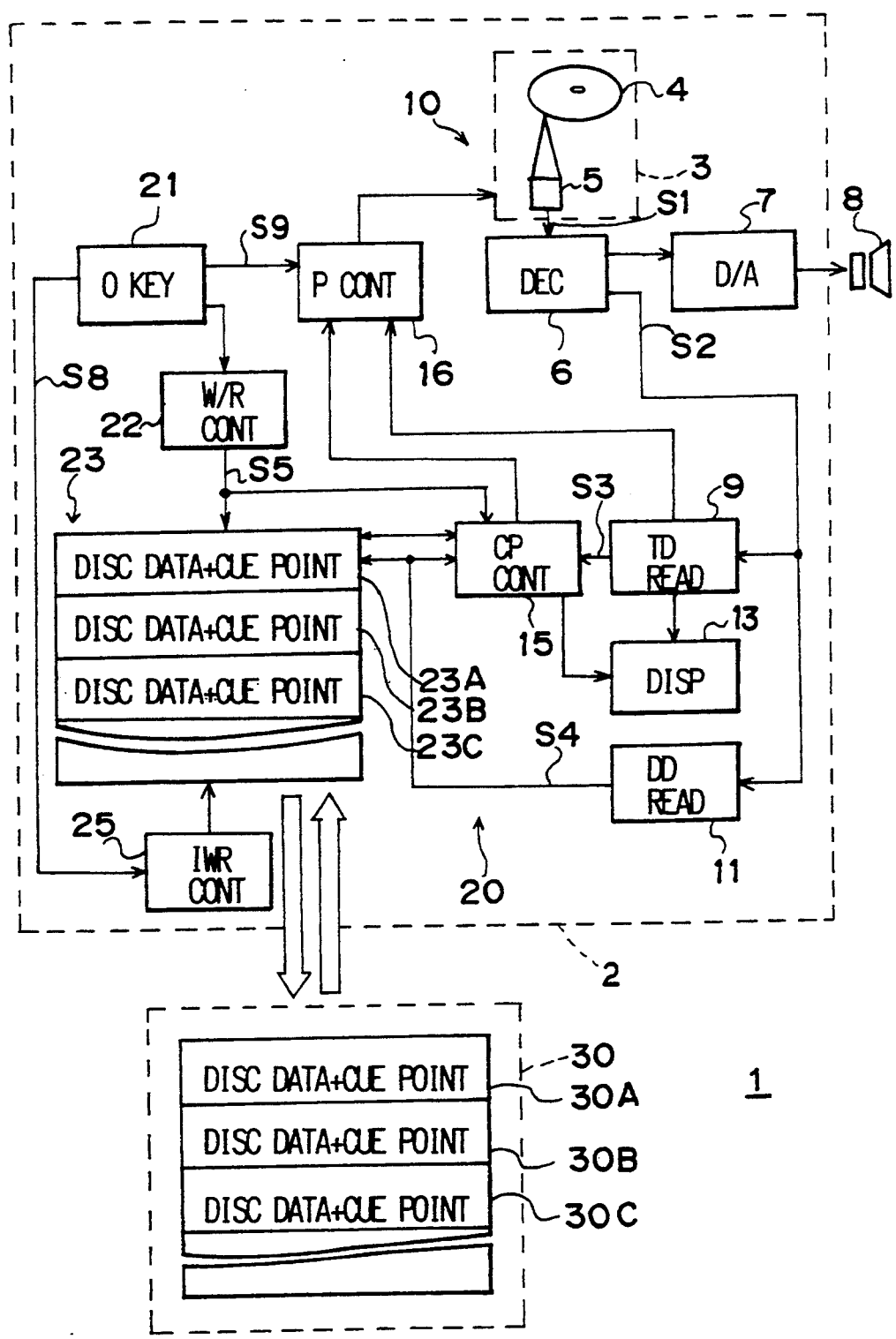
FIG. 1 is a block diagram representing a reproducing apparatus according to one embodiment of the present invention.

Preferred embodiments of this invention will be described with reference to the accompanying drawings:

In FIG. 1, 1 indicates a reproducing apparatus as a whole, wherein a reproducing device 2 comprises a compact disc player 10 and a controller 20 for controlling the compact disc player 10 by sending control signals for locating, reproducing and other operation.

That is, the reproducing device 2 obtains a reproducing signal S1 from the loaded disc 4 through an optical pickup device 5, inputs it to a decoder 6, thereby demodulating music information and time data recorded on the disc 4.

The music information demodulated in the decoder 6 is transformed into an analog signal through a digital-to-analog converter (D/A) 7, and is sent to a speaker unit 8. Then, reproducing data S2 other than the music information demodulated in the decoder 6 is sent to a time data reader 9 and a disc data reader 11.

The disc data reader 11 reads data intrinsic of the disc 4 reproduced then as disc data out of the reproducing data S2 outputted from the decoder 6, and then sends it to a cue point control circuit 15 and a cue point memory group 23.

Here, data for the first several selections of those which are recorded, for example, on the disc 4, or a method for putting a predetermined identification code at a first portion of a recording area of the disc 4 is employed as the data intrinsic of the disc 4.

Further, the time data reader 9 reads time data from the reproducing data S2 outputted from the decoder 6, and then sends it to the cue point control circuit 15, the display part 13 and a position control part 16.

The cue point control circuit 15 sets the time data then outputted from the time data reader 9 as cue point data (or reproducing start position data) according to a control signal S5 inputted from a disc operation key 21 through a write/read controller 22 when setting the cue point, and then sends it to the cue point memory group 23.

In this case, the cue point memory group 23 stores the time data and the disc data outputted from the cue point control circuit 15 and the disc data reader 11 in predetermined storage area 23A (or 23B, 23C, . . . ) as cue point data according to the control signal S5 inputted from the disc operation key 21 through the write/read controller 22.

Each storage area is allocated for a set cue point data, and the storage areas 23A, 23B, 23C, . . . can be loaded each with the data comprising a cue point data.

Then, write/read sequence of the cue point data is put to each storage area, and thus each cue point data is written or read to the storage area corresponding to the write/read sequence from a user specifying the write/read sequence by the disc operation key 21. Accordingly, in case, for example, a given set cue point data is data of the number to be reproduced (broadcasted) first for the program procedure, the cue point data is stored in the first storage area 23A by the user's key operation.

Here, in the reproducing apparatus 1, each cue point data stored in the cue point memory group 23 can be stored in the information card 30 as an external storage medium. The information card 30 comprises a mounted an IC memory, and plural information can be stored in the individual storage areas of.

That is, in a state where the cue point has been set and a series of cue point data of the predetermined program is stored in the cue point memory group 23, when the user manipulates the disc operation key 21 to specify an information card loading mode, a control signal S8 is sent to an information card write/read controller 25 (called an IC card write/read controller) from the disc operation key 21, and thus the IC card write/read controller 25 transmits each cue point data to the then loaded information card 30 from the cue point memory group 23 through a predetermined writing device (not shown) according to the control signal S8. In this case, the information card 30 stores the cue point data of the cue point memory group storage areas 23A, 23B, 23C . . are stored in storage areas 30A, 30B, 30C, . . . respectively.

Further, when transmitting the cue point data stored in the information card 30 to the cue point memory group 23 of the controller 20, the user manipulates the operation key 21 to specify a read mode from the information card 30, and thus the IC card write/read controller 25 transmits each cue point data from the information card 30 to the cue point memory group 23 through a predetermined reading device (not illustrated).

Then, the compact disc player 10 can be controlled according to each cue point data stored in the cue point memory group 23. The user manipulates the operation key 21 to specify a cue point control mode, and thus the control signal S5 is sent to the cue point memory group 23 and the cue point control circuit 15 through the write/read controller 22, and a control signal S9 is also sent to the position control device 16.

In this case, if the user specifies the order of reproduce (or broadcast) according to the broadcasting order number for the program procedure, then the cue point data stored in each storage area of the cue point memory group 23 which is stored in the storage area corresponding thereto is read out, and then sent to the cue point control circuit 15. Accordingly, when, for example, the cue point for the selection to be reproduced (or broadcasted) first for the program procedure is specified, the cue point is read from the first storage area 23A of the cue point memory group 23.

The cue point control circuit 15 decides whether or not the disc data of the first cue point data inputted then from the cue point memory group 23 coincides with the disc data read from the disc 4 loaded then, and if not coincident, an error message is displayed on the display part 13.

Then, in case the disc data of the loaded disc 4 coincides with the disc data of the cue point control circuit 15, this is indicates that the disc 4 required at this point in time is loaded for the program procedure. The cue point control circuit 15 compares the time data read from the disc 4 which is outputted from the time data reader 9, with the time data included in the cue point data which is stored then in the cue point control circuit 15. The cue point control circuit 15 then sends a predetermined control signal to the position control device 16 until they come to coincide to operate the compact disc player 3 consecutively for reproducing.

Here, when the time data stored in the cue point control circuit 15 and the time data outputted from the time data reader 9 (namely the time data read from the disc 4 kept then in a reproducing state) are coincident with each other, this indicates that a cue point of the selection specified by a user is detected. The cue point control circuit 15 sends a predetermined control signal to the position control device 16, thereby controlling the compact disc player 3 to enter a standby state on the position control device 16.

Thus, by user manipulation of the operation key 21 for timing of the start of reproduction of the selection kept in a stand-by state for reproducing (or broadcasting) for the program procedure, the position control device 16 controls the compact disc player 10 by comparing the time data specified by the cue point control circuit 15 with the actual time data outputted from the time data reader 9. Thereby reproduction of the selection will start from the cue point.

Figure 2:
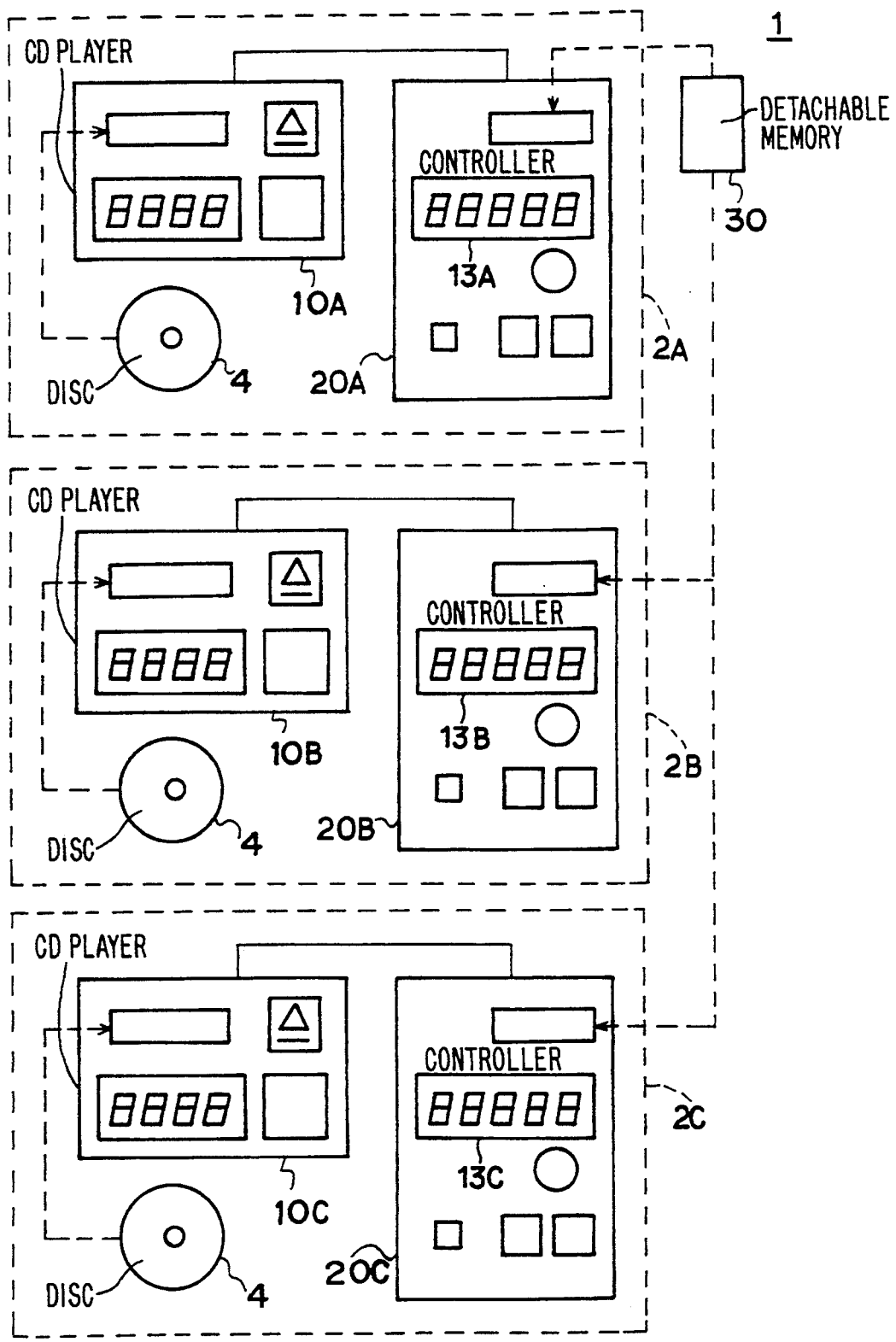
FIG. 2 is a diagram used to describe how a cue point set by a first reproducing device is read into another reproducing device by means of an information card (called an IC card).

A system will now be described, with reference to FIGS. 1 and 2, which employs reproducing devices 2A, 2B, 2C (the reproducing devices 2A, 2B, 2C are constructed as the reproducing device of FIG. 1). When rehearsing beforehand according to the program procedure, the rehearsing reproducing device 2A is loaded with the compact disc 4 as shown in FIG. 2. The cue point of the selection to be broadcasted first is found by listening to a reproducing sound of the compact disc 4, and from manipulating the operation key 21 of a controller 20A (or the controller 20 of FIG. 1 likewise). Cue point data indicating the cue point is stored in the first storage area of the cue point memory group 23 of the controller 20A as a first cue point.

Further in the reproducing device 2A, the cue point of the selection to be broadcasted second is found by reproduction of the disc 4 (or other disc), and from manipulating the operation key 21 of the controller 20A. Cue point data indicating this cue point is stored in the second storage area of the cue point memory group 23 of the controller 20A as a second cue point.

Still further, in the reproducing device 2A, the cue point of the selection to be broadcasted third is found by reproduction of the disc 4 (or other disc), and from manipulating the operation key 21 of the controller 20A. Cue point data indicating this cue point is stored in the third storage area of the cue point memory group 23 of the controller 20A as a third cue point.

As described above, cue point data (comprising disc data and time data of the cue points) of the selections to be broadcasted in one program are all stored in the cue point memory group 23 of the controller 20A. Then the reproducing device 2A is loaded with the information card 30, and all of the cue point data stored in the then cue point memory group 23 is stored in the corresponding storage areas of the information card 30. The information card is then detached from reproducing device 2A.

Thus, when a rehearsal is over, the aforementioned information card 30 is loaded in a controller 20B (or the controller 20 of FIG. 1 likewise) of the on-the-air reproducing device 2B (or the reproducing device 2 of FIG. 1 likewise), and each cue point data stored in the information card 30 is sent to the corresponding storage area of the cue point memory group 23 of the controller 20B.

Accordingly, the cue point data set at the time of the aforementioned rehearsal can be stored in the on-the-air reproducing device 2B, and the user is capable of locating the selection for broadcast by means of the cue point data when going on the air.

That is, the user loads the compact disc 4 on which the selection to broadcast (or reproduce) is recorded in the compact disc player 10 as referring to the program procedure. The user manipulates the controller 20B of the reproducing device 2B to input broadcasting order data of the selections to broadcast (or reproduce), and thus cue point data of the desired selection according to the data is read from the cue point memory group 23 of the controller 20B.

In this case, where the compact disc 4 loaded in a compact disc player 10B does not contain the desired selection, an error message is displayed on a display part 13B of the controller 20B, and thus a user is capable of recognizing the error. Accordingly, the user replaces the compact disc 4 with a correct one.

Then, when the required and correct compact disc 4 is loaded in the compact disc player 10B, the controller 20B controls the compact disc player 10B to find out cue point of the then specified selection, thereby keeping it stand-by and ready for reproducing at any time with the cue point as a reproducing start point.

Thus, upon receipt of directions from a program director in such stand-by state, the user manipulates a predetermined operation key, thereby starting reproducing immediately from the cue point.

As described above, since the cue point set beforehand in the rehearsing reproducing device 2A can be transferred to the reproducing device 2B, the reproducing device for broadcast, by means of the information card 30, a state of the program procedure set at the time of rehearsal can be reproduced in the reproducing device 2B. Accordingly, at the time when going on the air, a user is capable of setting a cue point of the selections to be broadcasted through a simple method of merely specifying the broadcasting order.

According to the above-described construction, cue point data set in the reproducing device 2A can be reproduced in other reproducing devices 2B, 2C, ... through the information card 30, therefore a serviceability for users can further be enhanced. For instance, a single rehearsal reproduction device can serve a multiplicity of broadcast reproduction devices.

In the above embodiment, the description has referred to the case where broadcasting order data is specified when cue points are set, however, the invention is not necessarily limited thereto, and hence, other various methods may be employed such that, for example, the controller 20 stores the setting order in a predetermined storage area as broadcasting order without specifying the broadcasting order data, or data having coded necessary numbers is set along with cue points of the numbers in addition.

Also, in the above embodiment, the description has referred to the case where the broadcasting order data is specified at the time when a selection is located according to the set cue point, however, the invention is not necessarily limited thereto, and hence other various methods may be used. For example, the cue point will be read in the broadcasting order at every manipulation of one operation key, or in case data having coded numbers is stored together with the cue point when setting the cue point, a code number of the music to broadcast will be inputted, thereby reading out the cue point of a selection corresponding thereto.

Further, in the above embodiment, the description has referred to the reproducing device where a single disc is loaded in a single compact disc player. However, the invention is not necessarily limited thereto, and hence such reproducing device which will store a plurality of discs, and reproduce a predetermined disc selectively as occasion demands may be employed. By using such a reproducing device, a user may avoid the troublesome work of replacing the disc on each occasion. Also when, for example, a reproducing of the first selection is over, the disc and the cue point of the ensuing second selection will be automatically set.

Additionally, in the above embodiment, the description has referred to the case where cue points are detected by one reproducing device 2B (or 2A, 2C, ... ) at the time of reproducing (namely, at the time of going on the air), however, the invention is not necessarily limited thereto, and hence when, for example, the next music starts in overlap before the first number ends thoroughly, two reproducing devices will be necessary. However, from storing the cue point data in each reproducing device by means of the detachable information card 30 in this case, the user is capable of using each reproducing device alternately as occasion demands.

Then, the in the above embodiment, the description has referred to the case where the detachable information card 30 in which an IC memory is incorporated as external memory is used. However, the invention is not limited thereto, and other various mediums may be used.

Further in the above embodiment, the description has referred to the case where the invention is applied to the reproducing apparatus with a compact disc as recording medium. However, the invention is not necessarily limited thereto, and hence is applicable extensively to reproducing apparatus using other various recording mediums.

It should be noted that the selections contained on the recording medium 4 may comprise musical number, however; the invention is not necessarily limited thereto, and hence is applicable extensively to cases where a reproducing start position of the recording medium in which other various information is recorded is set.

While there has been described in connection with the preferred embodiments of the invention, it will be obvious to those skilled in the art that various changes and modifications may be made therein without departing from the invention, and it is aimed, therefore, to cover in the appended claims all such changes and modifications within the true spirit and scope of the invention.

What is claimed is:

1. A system for reproducing first data from a recording medium in a desired sequence, comprising:
    at least a first reproducing apparatus and a second reproducing apparatus for reproducing the first data from the recording medium; wherein,
    said first reproducing apparatus is loaded with the recording medium and has means for producing second data indicative of cue points of each of the first data on the recording medium which are arbitrarily specified by a user, means for reproducing from the recording medium third data identifying the recording medium recorded with the first data, and means for producing list data including a plurality of pairs of the second and third data and means for writing the list data on a storing medium detachably installed in the first reproducing apparatus; and
    the second reproducing apparatus is thereafter loaded with the recording medium and the storing medium and has means for reading the list data from the storing medium on which the list data is written by the first reproducing apparatus and means for reproducing the first data from the recording medium beginning at each of a sequence cue points according to the list data.

2. A system according to claim 1, wherein the first reproducing apparatus has means for reading the second and third data from the recording medium, user operated means for generating a control signal and a memory storing the second and third data as the list data in response to the control signal.

3. A system according to claim 1, wherein the second reproducing apparatus has a memory for storing the list data read from the detachably installed storing medium, selecting means for selecting a pair of the second and third data from the list data stored in the memory, means for reading the second and third data from the recording medium, means for comparing the second and third data read from the recording medium and the selected pair of the second and third data and producing a comparison signal, and position controlling means for accessing a cue point on the recording medium at which recorded data reproduction is to be started according to the comparison signal.

4. A system according to claim 3, wherein the second reproducing apparatus further comprises a display supplied with the comparison signal for indicating error when the third data reproduced from the recording medium and the third data selected by the selecting means do not match.

5. An apparatus for reproducing first data from a recording medium, comprising:
    means for producing a plurality of pairs of the second and third data as list data, wherein the second data is indicative of cue points of each of the first data on the recording medium at which data reproduction is to be started, which cue points are arbitrarily specified by a user, and the third data identifies the recording medium recorded with the first data;
    means for controlling recording and writing of the list data on or from a storing medium detachably installed in the reproducing apparatus; and.
    means for reproducing the first data from the recording medium beginning at each of a sequence of cue points according to the list data.

6. An apparatus according to claim 5, further comprising a memory for storing the list data, means for controlling writing of the list data in the memory so that a selected one of the list data produced by the producing means or the list data stored in the installed storing medium is written in the memory.

7. An apparatus according to claim 5, wherein the reproducing apparatus includes means for selecting a pair of the second and third data from the list data stored in the memory, means for reading the second and third data from the recording medium, means for comparing the second and third data read from the recording medium and the selected pair of second and third data by the selecting means and producing a comparison signal, and position controlling means for accessing a cue point on the recording medium at which to begin reproduction of the first data according to the comparison signal.

8. A system according to claim 1, wherein the third data is a disc identification code and the means for producing the cue point data includes user operated key input means for setting a cue point.

9. An apparatus according to claim 1, wherein the third data is a disc identification code and the means for producing the second data and the third data as list data includes user operated key input means for setting a cue point.

* * * * *